(12) United States Patent
Ishige

(10) Patent No.: US 10,364,882 B2
(45) Date of Patent: Jul. 30, 2019

(54) CLUTCH AND STEERING DEVICE

(71) Applicant: Showa Corporation, Gyoda-shi (JP)

(72) Inventor: Shingo Ishige, Haga-gun (JP)

(73) Assignee: SHOWA CORPORATION, Gyoda-Shi (JP)

( * ) Notice: Subject to any disclaimer, the term of this patent is extended or adjusted under 35 U.S.C. 154(b) by 390 days.

(21) Appl. No.: 15/215,842

(22) Filed: Jul. 21, 2016

(65) Prior Publication Data

US 2017/0167597 A1 Jun. 15, 2017

(30) Foreign Application Priority Data

Dec. 14, 2015 (JP) ................................ 2015-243329

(51) Int. Cl.
| | | |
|---|---|---|
| *F16H 57/08* | (2006.01) | |
| *B62D 5/00* | (2006.01) | |
| *F16H 1/28* | (2006.01) | |
| *F16D 11/16* | (2006.01) | |
| *F16D 27/118* | (2006.01) | |

(52) U.S. Cl.
CPC ............ *F16H 57/08* (2013.01); *B62D 5/001* (2013.01); *B62D 5/003* (2013.01); *B62D 5/008* (2013.01); *F16D 11/16* (2013.01); *F16D 27/118* (2013.01); *F16H 1/28* (2013.01); *F16H 2057/087* (2013.01)

(58) Field of Classification Search
None
See application file for complete search history.

(56) References Cited

U.S. PATENT DOCUMENTS

| 4,577,715 A | 3/1986 | Saito | |
|---|---|---|---|
| 4,593,780 A | 6/1986 | Saito | |
| 5,347,458 A * | 9/1994 | Serizawa | ............... B62D 5/001 180/402 |

(Continued)

FOREIGN PATENT DOCUMENTS

| CN | 2851056 Y | 12/2006 |
|---|---|---|
| EP | 2628658 A | 8/2013 |

(Continued)

OTHER PUBLICATIONS

Extended European Search Report dated Jun. 20, 2017 for the corresponding European Patent Application No. 16181679.8.

(Continued)

*Primary Examiner* — Colby M Hansen
(74) *Attorney, Agent, or Firm* — Leason Ellis LLP

(57) ABSTRACT

A clutch for use in a steer-by-wire steering device for a vehicle is configured to switch between mechanically coupling and uncoupling a torque transmission path between a steering member operated by a driver and a wheel-turning unit configured to turn wheels. The clutch includes a position change member and a conduction path. The position change member is configured to change between a first position and a second position to switch between mechanically coupling and uncoupling the torque transmission path. The conduction path includes two points that come into contact with or separate from each other in accordance with positional change of the position change member. The conduction path is connected to an electric circuit configured to detect a change in a resistance value of the conduction path.

20 Claims, 14 Drawing Sheets

(56) References Cited

U.S. PATENT DOCUMENTS

| | | | |
|---|---|---|---|
| 6,345,681 B1 * | 2/2002 | Hackl | B62D 5/001 180/402 |
| 2002/0144855 A1 * | 10/2002 | Zheng | B62D 5/001 180/446 |
| 2004/0039508 A1 * | 2/2004 | Husain | B62D 5/003 701/41 |
| 2004/0267424 A1 * | 12/2004 | Yao | B62D 5/003 701/43 |
| 2014/0209403 A1 | 7/2014 | Ogi | |
| 2015/0203147 A1 | 7/2015 | Kuramochi et al. | |

FOREIGN PATENT DOCUMENTS

| | | |
|---|---|---|
| JP | 60-25853 A | 2/1985 |
| JP | 60-25854 A | 2/1985 |
| JP | 2007-127207 A | 5/2007 |
| JP | 2008-189266 A | 8/2008 |
| JP | 2011-000964 A | 1/2011 |
| JP | 2014-141226 A | 8/2014 |
| JP | 2015-089772 A | 5/2015 |

OTHER PUBLICATIONS

Office Action dated Dec. 5, 2018 for the corresponding Chinese Patent Application No. 201610608479.6 (an English translation attached hereto).

Office Action dated Mar. 26, 2019 for the corresponding Japanese Patent Application No. 2015-243329 (an English translation attached hereto).

* cited by examiner

CLUTCH AND STEERING DEVICE

CROSS-REFERENCE TO RELATED APPLICATIONS

The present application claims priority under 35 U.S.C. § 119 to Japanese Patent Application No. 2015-243329, filed Dec. 14, 2015. The contents of this application are incorporated herein by reference in their entirety.

BACKGROUND OF THE INVENTION

Field of the Invention

The present invention relates to a clutch and a steering device for use in a steering system for a vehicle.

Discussion of the Background

Japanese Unexamined Patent Application Publication No. 2008-189266, Japanese Unexamined Patent Application Publication No. 2007-127207, and Japanese Unexamined Patent Application Publication No. 2015-89772 disclose a clutch for use in a steer-by-wire (SBW) steering system. The clutch switches between mechanically coupling and uncoupling a torque transmission path between the steering member and the wheel-turning unit. As this kind of clutch, a claw clutch including a lock mechanism provided with an electromagnetic solenoid is used.

In the case of the clutch of the steer-by-wire steering device, it is preferable to readily detect whether the clutch is engaged.

SUMMARY OF THE INVENTION

According to one aspect of the present invention, a clutch for use in a steer-by-wire steering device for a vehicle is configured to switch between mechanically coupling and uncoupling a torque transmission path between a steering member operated by a driver and a wheel-turning unit configured to turn wheels. The clutch includes a position change member and a conduction path. The position change member is configured to change between a first position and a second position to switch between mechanically coupling and uncoupling the torque transmission path. The conduction path includes two points that come into contact with or separate from each other in accordance with positional change of the position change member. The conduction path is connected to an electric circuit configured to detect a change in a resistance value of the conduction path.

According to another aspect of the present invention, a steer-by-wire steering device for a vehicle includes a steering member, a wheel-turning unit, and a clutch. The steering member is operated by a driver. The wheel-turning unit is configured to turn wheels. The clutch is configured to switch between mechanically coupling and uncoupling a torque transmission path between the steering member and the wheel-turning unit. The clutch includes a position change member, a conduction path, and an electric circuit. The position change member is configured to change between a first position and a second position to switch between mechanically coupling and uncoupling the torque transmission path. The conduction path includes two points that come into contact with or separate from each other in accordance with positional change of the position change member. The electric circuit is connected to the conduction path so as to detect a change in a resistance value of the conduction path.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 2A and 2B are diagrams schematically illustrating an exemplary configuration of a clutch according to the embodiment, of which FIG. 2A illustrates the clutch in a released state, and FIG. 2B illustrates the clutch in an engaged state;

FIGS. 3A and 3B are diagrams schematically illustrating another exemplary configuration of the clutch according to the embodiment, of which FIG. 3A illustrates the clutch in a released state, and FIG. 3B illustrates the clutch in an engaged state;

FIGS. 4A and 4B are diagrams schematically illustrating an exemplary configuration of a lock mechanism according to the embodiment, of which FIG. 4A illustrates a lever changed to a first position, and FIG. 4B illustrates the lever changed to a second position;

FIGS. 6A and 6B are diagrams schematically illustrating an exemplary configuration of a lock mechanism according to another embodiment, of which FIG. 6A illustrates the lever changed to the first position, and FIG. 6B illustrates the lever changed to the second position;

FIGS. 7A, 7B, and 7C are diagrams illustrating states of a variable pitch spring, of which FIG. 7A illustrates an extending state, FIG. 7B illustrates an intermediate state, and FIG. 7C illustrates a contracting state;

FIGS. 8A and 8B are diagrams schematically illustrating an exemplary configuration of a lock mechanism according to another embodiment, of which FIG. 8A illustrates the lever changed to the first position, and FIG. 8B illustrates the lever changed to the second position;

FIGS. 11A and 11B are diagrams schematically illustrating an exemplary configuration of a lock mechanism according to another embodiment, of which FIG. 11A illustrates the lever changed to the first position, and FIG. 11B illustrates the lever changed to the second position;

FIGS. 13A and 13B are diagrams schematically illustrating an exemplary configuration of a lock mechanism according to another embodiment, of which FIG. 13A illustrates the lever changed to the first position, and FIG. 13B illustrates the lever changed to the second position.

DESCRIPTION OF THE EMBODIMENTS

Figure 1:
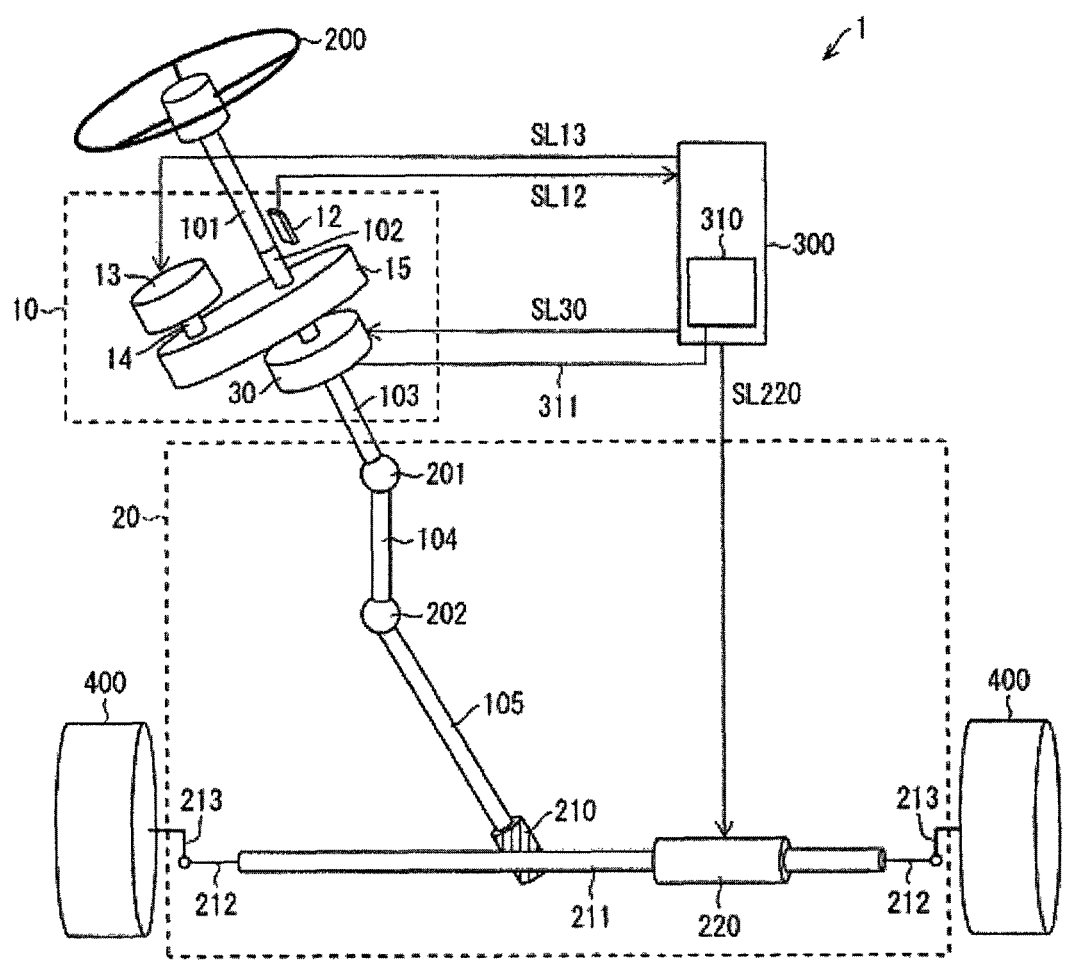
FIG. 1 is a diagram schematically illustrating a configuration of essential components of a steering device according to an embodiment.

The embodiments will now be described with reference to the accompanying drawings, wherein like reference numerals designate corresponding or identical elements throughout the various drawings.

A steering device 1 and a clutch 30 according to embodiment 1 will now be described with reference to FIGS. 1 to 5C.

FIG. 1 is a diagram schematically illustrating a configuration of essential components of the steering device 1. As illustrated in FIG. 1, the steering device 1 includes a steering unit 10, a wheel-turning unit 20, a steering member 200, and a controller 300. The steering device 1 is used for turning wheels 400 in accordance with the driver's steering operation through the steering member 200.

The steering device 1 is a steer-by-wire steering device for a vehicle, which has at least two functions, namely a function of mechanically coupling or uncoupling a torque transmission path between the steering member 200 and the wheel-turning unit 20, and a function of electrically controlling a turning angle of the wheels 400 in accordance with a steering operation through the steering member 200 in a state in which the torque transmission path is uncoupled.

As illustrated in FIG. 1, a steering wheel having a wheel shape is taken as an example of the steering member 200. This, however, does not limit this embodiment. A device having other shape and mechanism may be used insofar as the device is capable of accepting a steering operation by the driver.

Steering Unit 10

The steering unit 10 has both a function of accepting the driver's steering operation through the steering member 200 and a function of mechanically coupling or uncoupling the torque transmission path between the steering member 200 and the wheel-turning unit 20. Also, the steering unit 10 has a function of generating reaction force with respect to the steering operation and transmitting the reaction force to the steering member 200.

As illustrated in FIG. 1, the steering unit 10 includes an upper steering shaft 101, an intermediate steering shaft 102, a lower steering shaft 103, a torque sensor 12, a motive power generator 13, a motive power transmission shaft 14, a motive power transmitter 15, and the clutch 30.

In this embodiment, "steering shaft" refers to a shaft coaxially disposed between the steering member 200 and a first universal joint 201, described later, such as the upper steering shaft 101, the intermediate steering shaft 102, and the lower steering shaft 103 illustrated in FIG. 1.

"Upper end" refers to an end portion on the upstream side in the transmission path of steering force in accordance with a steering operation by the driver (namely, an end on the input side) while "lower end" refers to an end portion on the downstream side in the transmission path of steering force (namely, an end on the output side) (the same applies below).

The upper end of the upper steering shaft 101 is coupled to the steering member 200 in a torque transmittable manner. Here, "coupled in a torque transmittable manner" refers to coupling of a first member to a second member in such a manner that the second member rotates in accordance with rotation of the first member. For example, its signification at least includes a case where the first member and the second member are integral to each other, a case where the second member is directly or indirectly secured to the first member, and a case where the first member and the second member are coupled to each other through a component such as a joint in such a manner that the first member and the second member operate in conjunction with each other.

In this embodiment, the upper end of the upper steering shaft 101 is secured to the steering member 200 in such a manner that the steering member 200 and the upper steering shaft 101 integrally rotate.

The upper steering shaft 101 and the intermediate steering shaft 102 are coupled to each other in a torque transmittable manner and elastically. Torsion caused between the upper steering shaft 101 and the intermediate steering shaft 102 is detected by the torque sensor 12.

More specifically, the upper steering shaft 101 and the intermediate steering shaft 102 each have a cavity inside, and a torsion bar is disposed in the cavities to elastically couple the upper steering shaft 101 and the intermediate steering shaft 102. When the driver performs a steering operation through the steering member 200, a torsion angle $\theta_T$ is caused between the upper steering shaft 101 and the intermediate steering shaft 102 in accordance with the magnitude of a torsion T of the steering operation. The torque sensor 12 detects this torsion angle $\theta_T$ and outputs to the controller 300 a torque sensor signal SL12 indicating a detection result. It is noted that the steering unit 10 may include a steering angle sensor to detect a steering angle of the steering member 200 so as to output to the controller 300 a signal indicating a steering angle or a steering angle speed detected.

The motive power transmitter 15 is coupled to the intermediate steering shaft 102 in a torque transmittable manner with respect to the intermediate steering shaft 102. The lower end of the intermediate steering shaft 102 is coupled to the clutch 30.

The motive power generator 13 applies a torque to the motive power transmission shaft 14 in accordance with a torque control signal SL13 output from the controller 300.

In a non-limiting embodiment, the motive power generator 13 is a motor main body, and the motive power transmission shaft 14 is a motor output shaft that penetrates the motor main body and is rotated by the motor main body. The motive power transmission shaft 14 may be another shaft coupled to the motor output shaft in a torque transmittable manner.

The motive power transmitter 15 is coupled to the motive power transmission shaft 14 in a torque transmittable manner with respect to the motive power transmission shaft 14.

The motive power transmitter 15 is a motive power transmission mechanism to transmit torque between the motive power transmission shaft 14 and the intermediate steering shaft 102. For example, gear-drive, belt-drive, chain-drive, friction-drive, and traction-drive motive power transmission mechanisms or a combination of these motive power transmission mechanisms may be used. The gear-drive motive power transmission mechanism may include, for example, helical gears, planetary gears, and a combination of a worm gear and a worm wheel. The friction-drive motive power transmission mechanism and the traction-drive motive power transmission mechanism may include, for example, planetary rollers. It is noted that the motive power transmitter 15 may not necessarily include reduction gears.

The torque generated by the motive power generator 13 is transmitted to the intermediate steering shaft 102 through the motive power transmission shaft 14 and the motive power transmitter 15.

When an electric motor for general use is used as the motive power generator 13, it is possible to further reduce the production cost.

The clutch 30 is arranged to switch between mechanically coupling and uncoupling the torque transmission path between the steering member 200 and the wheel-turning unit 20 in accordance with a clutch control signal SL30 output from the controller 30. More specifically, the clutch 30 is arranged to switch between mechanically coupling and uncoupling torque transmission between the lower end of the intermediate steering shaft 102 and the upper end of the lower steering shaft 103 in accordance with the clutch control signal SL30. A specific configuration of the clutch 30 will be described later.

Controller 300

The controller 300 controls wheel-turning force generated by a wheel-turning force generator 220 and torque generated by the motive power generator 13 in accordance with a steering operation by the driver.

More specifically, referring to the torque sensor signal SL12 output from the torque sensor 12, the controller 300 generates the torque control signal SL13 for controlling the torque generated by the motive power generator 13 and a wheel-turning force control signal SL220 for controlling the wheel-turning force generated by the wheel-turning force generator 220. The controller 300 respectively outputs the torque control signal SL13 and the wheel-turning force control signal SL220 to the motive power generator 13 and the wheel-turning force generator 220.

The controller 300 may further refer to such signals as a signal indicating a steering angle of the steering member 200 and a vehicle speed signal from a vehicle speed sensor so as to generate the torque control signal SL13 and the wheel-turning force control signal SL220.

The controller 300 outputs the clutch control signal SL30 to the clutch 30 so as to control switching between a coupled state and an uncoupled state of the clutch 30.

When the clutch 30 is in the uncoupled state, the controller 300 controls the motive power generator 13 to generate a reaction force with respect to a steering operation by the driver. More specifically, the controller 300 controls the motive power generator 13 to transmit to the steering shaft a reaction force torque in a reverse direction to the driver's steering torque input through the steering member 200. This enables the driver to obtain a tactile response to the steering operation.

The specific control method of the clutch 30 by the controller 300 does not limit this embodiment. For example, the controller 300 may be arranged to switch the clutch 30 to the coupled state in such an occasion as when some malfunction occurs in the steering device 1 and at the time of ignition off. With this configuration, at the time of occurrence of malfunction and ignition off, it is possible for the driver to turn the wheels 400 even without passing through an electric path.

When the clutch 30 is in the coupled state, the controller 300 may be arranged to control the motive power generator 13 in such a manner that torque in the same direction as the driver's steering torque input through the steering member 200 is transmitted to the steering shaft. Thus, even in the coupled state of the clutch 30, it is possible for the driver to perform the steering operation without requiring large force.

The controller 300 includes an electric circuit 310. The electric circuit 310 is a circuit to detect a resistance value of a conduction path connected to the electric circuit 310. The electric circuit 310 is connected to the clutch 30 through wiring 311.

Wheel-Turning Unit 20

The wheel-turning unit 20 is arranged to turn the wheels 400 in accordance with a steering operation by the driver which has been accepted by the steering unit 10.

As illustrated in FIG. 1, the wheel-turning unit 20 includes a first universal joint 201, an intermediate shaft 104, a second universal joint 202, a pinion shaft 105, a pinion gear 210, a rack shaft 211, tie rods 212, knuckle arms 213, and the wheel-turning force generator 220.

The upper end of the intermediate shaft 104 is coupled to the lower end of the lower steering shaft 103 through the first universal joint 201 in a torque transmittable manner.

The lower end of the intermediate shaft 104 is coupled to the upper end of the pinion shaft 105 through the second universal joint 202 in a torque transmittable manner.

The pinion gear 210 is coupled to the lower end of the pinion shaft 105 in a torque transmittable manner with respect to the pinion shaft 105. More specifically, the pinion gear 210 is secured to the pinion shaft 105 to make the pinion shaft 105 and the pinion gear 210 integrally rotate.

A rack is formed on a portion of the rack shaft 211 that is opposed to the pinion gear 210 to mesh with the pinion gear 210.

When the clutch 30 is in the coupled state, the driver's steering operation through the steering member 200 causes the pinion gear 210 to rotate to displace the rack shaft 211 in the axial direction.

When the clutch 30 is in the uncoupled state, the wheel-turning force generator 220 generates wheel-turning force in accordance with the wheel-turning force control signal SL220 from the controller 300 so as to displace the rack shaft 211 in the axial direction.

When the rack shaft 211 is displaced in the axial direction, the wheels 400 are turned through the tie rods 212 on both ends of the rack shaft 211 and the knuckle arms 213 coupled to the tie rods 212.

It is noted that the specific configuration of the wheel-turning force generator 220 does not limit this embodiment. The following configurations can be taken as examples.

Exemplary Configuration 1

The wheel-turning force generator 220 includes a motor and a conversion mechanism to convert rotation of the output shaft of the motor into linear movement of the rack shaft 211 in the axial direction. What is called a ball screw mechanism may be used as the conversion mechanism. The ball screw mechanism includes, for example, a nut, a rack-shaft helical groove, and a plurality of rolling balls. The nut has an inner surface in which a nut helical groove is formed. The nut is rotated by the motor. The rack-shaft helical groove is formed in an outer surface of the rack shaft and has the same pitch as the nut helical groove. The plurality of rolling balls are clamped between the nut helical groove and the rack-shaft helical groove.

Moreover, the wheel-turning force generator 220 may include a drive pulley, a driven pulley, and a belt. The drive pulley is coupled to the output shaft of the motor disposed along the rack shaft 211, in a torque transmittable manner. The driven pulley is coupled to the nut in a torque transmittable manner. The belt is wound around the drive pulley and the driven pulley so as to transmit torque from the drive pulley to the driven pulley.

Exemplary Configuration 2

The wheel-turning force generator 220 may include a hollow motor coaxial with the rack shaft 211. The hollow motor rotates the nut in exemplary configuration 1. This configuration does not require the drive pulley and the driven pulley in exemplary configuration 1, and thus reduces the installation space.

Exemplary Configuration 3

In place of the ball screw mechanism, the wheel-turning force generator 220 may include a second pinion shaft and a pinion gear. The second pinion shaft is rotated by the motor. The pinion gear is coupled to the second pinion shaft in a torque transmittable manner. The pinion gear meshes with a second rack formed on the rack shaft 211.

Exemplary Configuration 4

In the above exemplary configurations, the wheel-turning force generator 220 transmits wheel-turning force to the rack shaft 211. This, however, does not limit this embodiment. For example, as the wheel-turning force generator 220, a configuration may be provided with a motor, a worm, and a worm wheel. The worm is rotated by the motor. The worm wheel meshes with the worm. The worm wheel is coupled to the pinion shaft 105 in a torque transmittable manner.

Clutch 30

Figure 2A:
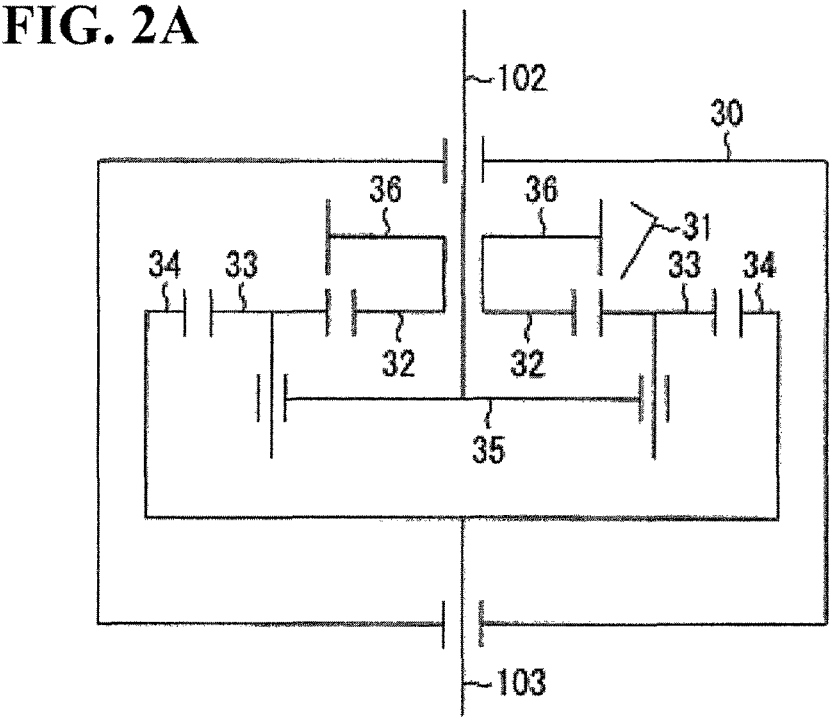
Figure 2B:
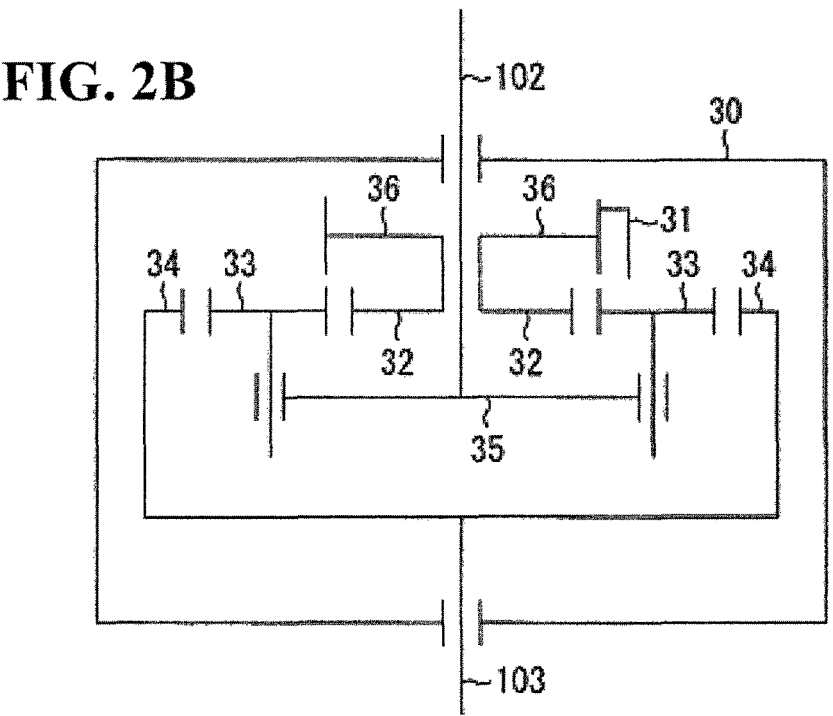

Next, an exemplary configuration of the clutch 30 will be described more specifically. The clutch 30 includes a position change member changed between a first position and a second position so as to switch between mechanically coupling and uncoupling the torque transmission path between the steering member 200 and the wheel-turning unit 20. In this embodiment, the position change member of the clutch 30 is a lever 31. FIGS. 2A and 2B are diagrams schematically illustrating the exemplary configuration of the clutch 30 including this lever 31. FIG. 2A illustrates the clutch 30 in a released state, and FIG. 2B illustrates the clutch 30 in an engaged state.

As illustrated in FIGS. 2A and 2B, the clutch 30 includes a planetary gear mechanism, a lock wheel 36 (which is the second rotation member), and the lever 31. The planetary gear mechanism includes a sun gear 32, a plurality of planetary gears 33, an internal gear 34, and a carrier (which is the first rotation member) 35. The carrier 35 is coupled to the intermediate steering shaft 102 in a torque transmittable manner. The internal gear 34 is coupled to the lower steering shaft 103 in a torque transmittable manner. The lever 31 is changed between the first position illustrated in FIG. 2A and the second position illustrated in FIG. 2B.

The internal gear 34 is coaxially disposed around the sun gear 32. Each of the planetary gears 33 is disposed on the outer circumference of the sun gear 32 and on the inner circumference of the internal gear 34 in such a manner that the planetary gear 33 meshes with the sun gear 32 and the internal gear 34. It is noted that the number of the planetary gears 33 is not particularly limited. The carrier 35 is a rotation member to support each of the planetary gears 33 rotatably (to make it revolve and rotate on its own axis) and also to rotate coaxially with the sun gear 32. The lock wheel 36 is a rotation member to rotate integrally with the sun gear 32. It is noted that two members "rotate integrally" refers to that the two members are coupled to each other in a torque transmittable manner, and that when one of the two rotates, the other also rotates, and when one of the two stops rotating, the other also stops rotating.

As illustrated in FIG. 2A, when the lever 31 takes the first position, the lever 31 is separate from the lock wheel 36, and the lock wheel 36 is in a non-locked state. This enables the sun gear 32, which is coupled to the lock wheel 36 in a torque transmittable manner, to idle. Since the sun gear 32 idles, no torque is transmitted from the carrier 35 to the internal gear 34. This mechanically uncouples the torque transmission path between the intermediate steering shaft 102 and the lower steering shaft 103 (namely, the torque transmission path between the steering member 200 and the wheel-turning unit 20). That is, the clutch 30 is released.

As illustrated in FIG. 2B, when the lever 31 takes the second position, the lever 31 meshes with the lock wheel 36, and the lock wheel 36 is in a locked state. Consequently, the sun gear 32, which is coupled to the lock wheel 36 in a torque transmittable manner, is fixed. Since the sun gear 32 is fixed, torque is transmitted from the carrier 35 to the internal gear 34. This mechanically couples the torque transmission path between the intermediate steering shaft 102 and the lower steering shaft 103 (namely, the torque transmission path between the steering member 200 and the wheel-turning unit 20). That is, the clutch 30 is engaged.

It is noted that even if coupling combinations of the three elements, namely, the sun gear 32, the internal gear 34, and the carrier 35, with the intermediate steering shaft 102, the lower steering shaft 103, and the lock wheel 36 are changed, approximately the same effects can be obtained. In this case, one of the three elements, namely, the sun gear 32, the internal gear 34, and the carrier 35, integrally rotates with the lock wheel 36.

Figure 3A:
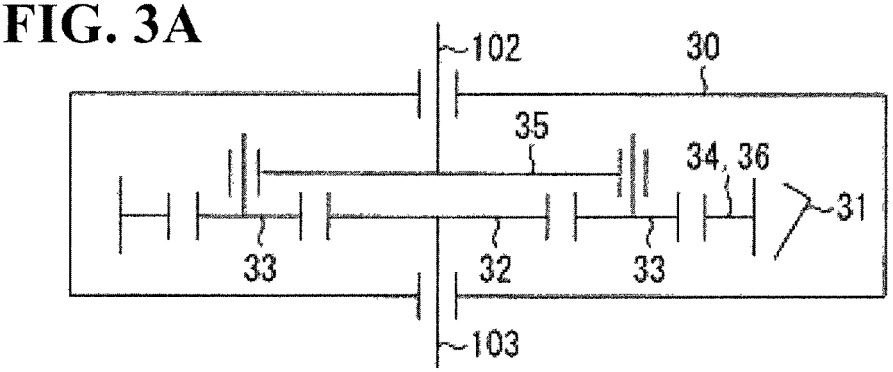
Figure 3B:
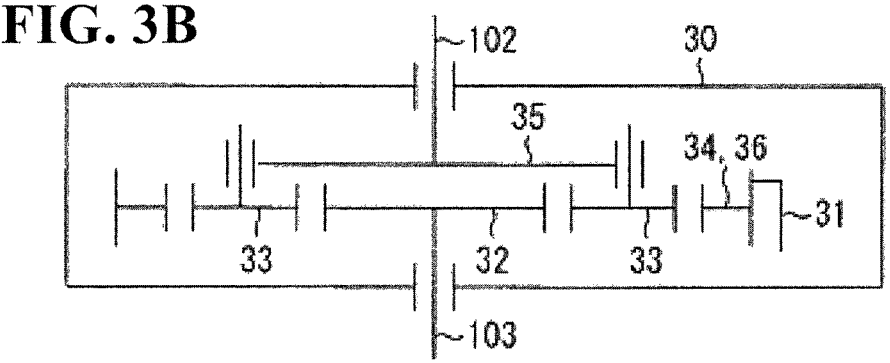

FIGS. 3A and 3B are diagrams schematically illustrating another exemplary configuration of the clutch 30. FIG. 3A illustrates the clutch 30 in a released state, and FIG. 3B illustrates the clutch 30 in an engaged state. In the exemplary configuration illustrated in FIGS. 3A and 3B, the clutch 30 includes the planetary gear mechanism and the lever 31. The planetary gear mechanism includes the sun gear 32, the planetary gears 33, the internal gear 34, and the carrier 35, which are coaxially disposed. The internal gear 34 and the lock wheel 36 rotate integrally. The carrier 35 is coupled to the intermediate steering shaft 102 in a torque transmittable manner. The sun gear 32 is coupled to the lower steering shaft 103 in a torque transmittable manner.

As illustrated in FIG. 3A, when the lever 31 takes the first position, the lever 31 is separate from the lock wheel 36 (internal gear 34), and the lock wheel 36 (internal gear 34) is in a non-locked state. This enables the internal gear 34 to idle. Since the internal gear 34 idles, no torque is transmitted from the carrier 35 to the sun gear 32. This mechanically uncouples the torque transmission path between the intermediate steering shaft 102 and the lower steering shaft 103 (namely, the torque transmission path between the steering member 200 and the wheel-turning unit 20). That is, the clutch 30 is released.

As illustrated in FIG. 3B, when the lever 31 takes the second position, the lever 31 meshes with the lock wheel 36 (internal gear 34), and the lock wheel 36 (internal gear 34) is in a locked state. Consequently, the internal gear 34 is fixed. Since the internal gear 34 is fixed, torque is transmitted from the carrier 35 to the sun gear 32. This mechanically couples the torque transmission path between the intermediate steering shaft 102 and the lower steering shaft 103 (namely, the torque transmission path between the steering member 200 and the wheel-turning unit 20). That is, the clutch 30 is engaged.

As described above, in this embodiment, when the lever 31 takes the second position, the lever 31 engages with the lock wheel 36 to lock its rotation. Of the three elements, namely, the sun gear 32, the carrier 35, and the internal gear 34, one element (which is the first element) is coupled to the intermediate steering shaft 102 (or the steering member 200) in a torque transmittable manner. Another element (which is the second element) is coupled to the lower steering shaft 103 (or the wheel-turning unit 20) in a torque transmittable manner. The other element (which is the third element) is arranged to rotate integrally with the lock wheel 36. This configuration desirably implements the clutch 30 in which the lever 31 changes between the first position and the second position to switch between mechanically coupling and uncoupling the torque transmission path between the intermediate steering shaft 102 and the lower steering shaft 103. The present invention, however, is not limited to this configuration. Any clutch may be used as the clutch 30 insofar as the lever 31 changes between the first position and the second position to switch between mechanically coupling and uncoupling the torque transmission path between the intermediate steering shaft 102 and the lower steering shaft 103.

Lock Mechanism

Figure 4A:
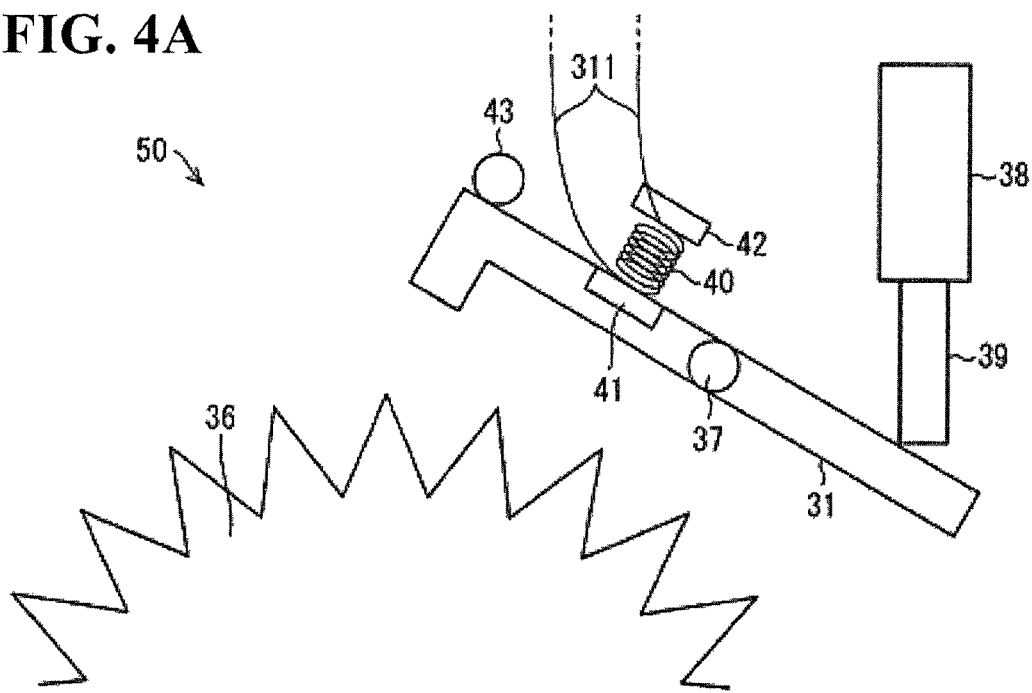
Figure 4B:
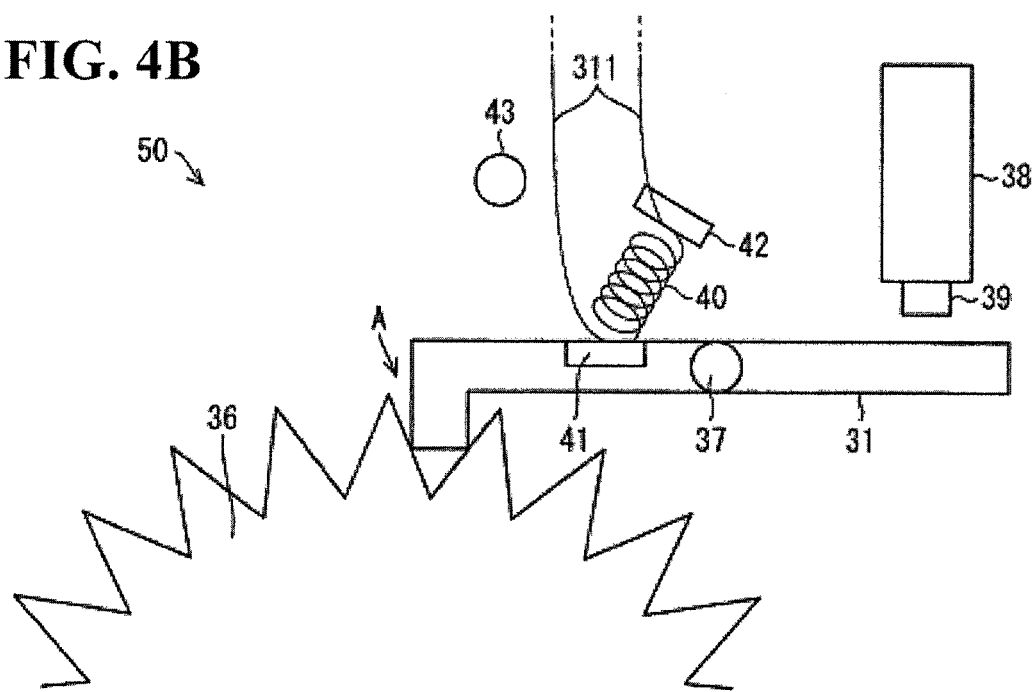

Next, detailed description will be made on a lock mechanism 50 of the lock wheel 36 using the lever 31. FIGS. 4A and 4B are diagrams schematically illustrating an exemplary configuration of the lock mechanism 50 in this embodiment. FIG. 4A illustrates a state in which the lever 31 takes the first position, and FIG. 4B illustrates a state in which the lever 31 takes the second position.

The lever 31 is a lever that rotates about a rotation shaft 37 of the lever 31. The lever 31 is changed between the first position and the second position by rotating about the rotation shaft 37. As illustrated in FIG. 4A, when the lever 31 takes the first position, the lever 31 separates from the lock wheel 36, and the lock wheel 36 is in the non-locked state in which the torque transmission path between the steering member 200 and the wheel-turning unit 20 is mechanically uncoupled. As illustrated in FIG. 4B, when the lever 31 takes the second position, the lever 31 engages with the lock wheel 36 (lock position A in FIG. 4B) and locks rotation of the lock wheel 36 to mechanically couple the torque transmission path between the steering member 200 and the wheel-turning unit 20.

As illustrated in FIGS. 4A and 4B, the clutch 30 includes an electromagnetic solenoid 38 and a stopper pin (which is the stopper) 43. The electromagnetic solenoid 38 includes a plunger 39. As illustrated in FIG. 4A, the electromagnetic solenoid 38 presses the plunger 39 on the lever 31 on the side opposite to the lock position A side across the rotation shaft 37 so as to drive the lever 31 to the first position and separate the lever 31 from the lock wheel 36. When the lever 31 takes the first position, the stopper pin 43 comes into contact with the lever 31 and stops further positional change of the lever 31.

The clutch 30 also includes a coil spring 40, which is a helical compression spring. Both ends of the coil spring 40 are pressurized in a contracting direction of the coil spring 40 and secured respectively to a first securing portion 41 and a second securing portion 42. The first securing portion 41 is disposed on the lever 31 on the lock position A side of the rotation shaft 37. The second securing portion 42 is disposed on the side of the lever 31 that is opposite to the lock wheel 36 side. With this configuration, the coil spring 40 biases the lever 31 toward the second position (namely, toward the lock wheel 36). Thus, as illustrated in FIG. 4B, when the electromagnetic solenoid 38 is not driving the lever 31, the coil spring 40 drives the lever 31 to the second position. It is noted that as illustrated in FIG. 4A, such adjustment is performed in advance that adjacent rings in sequence of the coil spring 40 come into contact with each other to cause line-to-line contact of the coil spring 40 when the electromagnetic solenoid 38 is driving the lever 31.

In this manner, when the electromagnetic solenoid 38 is driving the lever 31, the torque transmission path between the steering member 200 and the wheel-turning unit 20 is mechanically uncoupled (the clutch 30 is released), and wheel-turning force of the wheel-turning unit 20 is only wheel-turning force generated by the wheel-turning force generator 220. When the electromagnetic solenoid 38 is not driving the lever 31, the torque transmission path between the steering member 200 and the wheel-turning unit 20 is mechanically coupled (the clutch 30 is engaged), and steering force applied to the steering member 200 becomes wheel-turning force of the wheel-turning unit 20. Thus, if the electric system has such a malfunction that the functions of the electromagnetic solenoid 38 and the wheel-turning force generator 220 are lost, the torque transmission path between the steering member 200 and the wheel-turning unit 20 is mechanically coupled to improve safety.

It is noted that a torsion spring is generally used as the spring for biasing the lever 31, and that using the coil spring 40 is an original configuration of this embodiment.

The coil spring 40 is made of a conductor, and both ends of the coil spring 40 are connected to an electric circuit 310 through the wiring 311. As described above, the electric circuit 310 is a circuit to detect a resistance value of a conduction path connected to the electric circuit 310. In this embodiment, the electric circuit 310 is capable of detecting a change in the resistance value of the conduction path made up of the coil spring 40. Preferably, the first securing portion 41 and the second securing portion 42 are made of insulators not to affect the resistance value of the conduction path.

Figure 5A:
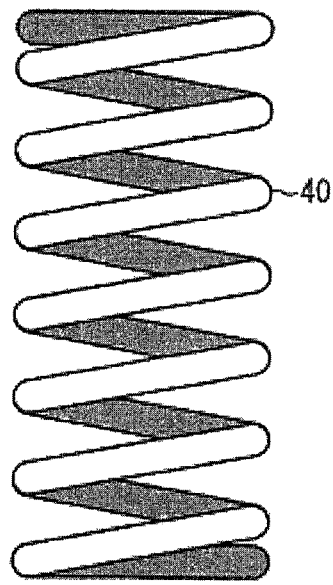
FIG. 5A illustrates a coil spring in an extending state.
Figure 5B:
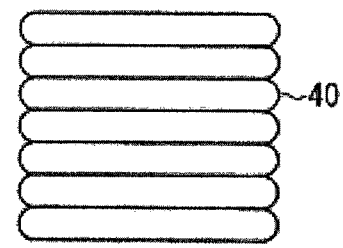
FIG. 5B illustrates the coil spring in a contracting state.

The coil spring 40 extends (FIG. 4A) and contracts (FIG. 4B) in accordance with positional change of the lever 31. As illustrated in FIG. 5A, when the coil spring 40 is extending, adjacent rings in sequence of the coil spring 40 are separate from each other. As illustrated in FIG. 5B, when the coil spring 40 is contracting, adjacent rings in sequence of the coil spring 40 are in contact with each other to cause line-to-line contact. The line-to-line contact results in a short in the conduction path of the coil spring 40 and reduces the resistance value of the conduction path. Therefore, the resistance value of the conduction path of the coil spring 40 changes in accordance with positional change of the lever 31. A change in the resistance value of the conduction path of the coil spring 40 is detected by the electric circuit 310 to detect the positional change of the lever 31. As described above, in accordance with the positional change of the lever 31, the torque transmission path between the steering member 200 and the wheel-turning unit 20 is mechanically coupled or uncoupled. Consequently, detection of the positional change of the lever 31 makes it possible to detect whether the clutch 30 is engaged.

In other words, the conduction path of the coil spring 40 can be regarded as a conduction path including two points that come into contact with or separate from each other in accordance with positional change of the lever 31. When the conduction path includes two specific points that come into contact with or separate from each other in accordance with positional change of the lever 31, the resistance value varies in accordance with the positional change of the lever 31. In the present invention, therefore, a desired conduction path including two points that come into contact with or separate from each other in accordance with positional change of the lever 31 may be used in place of the conduction path of the coil spring 40.

Figure 5C:
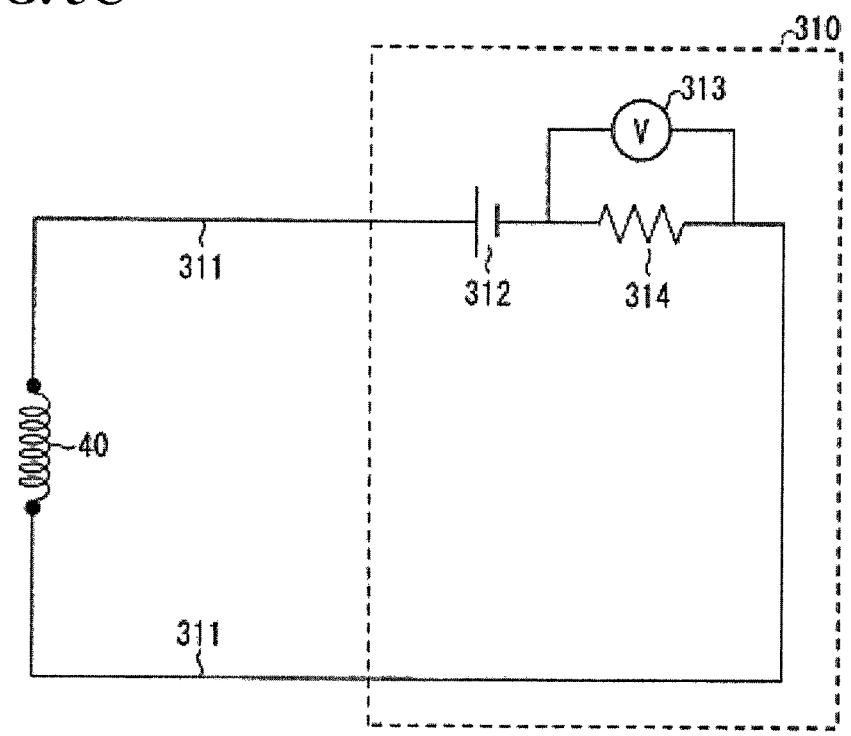
FIG. 5C is a circuit diagram illustrating an exemplary electric circuit according to the embodiment.

FIG. 5C is a circuit diagram illustrating an example of the electric circuit 310. The electric circuit 310 includes a direct-current (DC) power source 312, a voltmeter 313, and a resistor 314 connected in parallel to the voltmeter 313. The electric circuit 310 is connected to the conduction path of the coil spring 40 through the wiring 311. When the resistance value of the conduction path changes, a voltage measured by the voltmeter 313 also changes. Consequently, with this electric circuit 310, a change in the resistance value of the conduction path of the coil spring 40 can be desirably detected. It is noted that the configuration of the electric circuit 310 is not limited to the circuit illustrated in FIG. 5C insofar as a change in the resistance value of the conduction path of the coil spring 40 can be detected.

As has been described so far, the clutch 30 includes the lever 31 and the conduction path. The lever 31 changes between the first position and the second position to switch between mechanically coupling and uncoupling the torque transmission path between the steering member 200 and the wheel-turning unit 20. The conduction path includes the two points that come into contact with or separate from each other in accordance with positional change of the lever 31. The conduction path is connected to the electric circuit 310 to detect a change in the resistance value of the conduction path. Thus, since the resistance value of the conduction path changes depending on a state of the clutch 30, the electric circuit 310 to detect the change in the resistance value of the conduction path facilitates detection as to whether the clutch 30 is engaged.

Instead of the configuration in this embodiment, a device such as a sensor to directly detect driving of the electromagnetic solenoid 38 may be provided to detect the position of the lever 31. This, however, is not preferable for the following reason. When drive of the electromagnetic solenoid 38 is directly detected, it is necessary to additionally dispose a device such as a sensor in a narrow space inside or around the electromagnetic solenoid 38. This complicates the configuration and increases the cost. Conversely, with the configuration of this embodiment, a complicated configuration including an additional device such as a sensor is unnecessary. Moreover, even if the plunger 39 or the lever 31 is damaged to hinder normal operation of the lever 31, the configuration of this embodiment ensures detection of the operation of the lever 31.

Embodiment 2

A lock mechanism 51 according to embodiment 2 will now be described with reference to FIGS. 6A and 6B. The components already described in this specification will be denoted with the same reference numerals and will not be elaborated here. The steering device 1 and the clutch 30 may include the lock mechanism 51 according to embodiment 2 in place of the lock mechanism 50 according to embodiment 1.

Figure 6A:
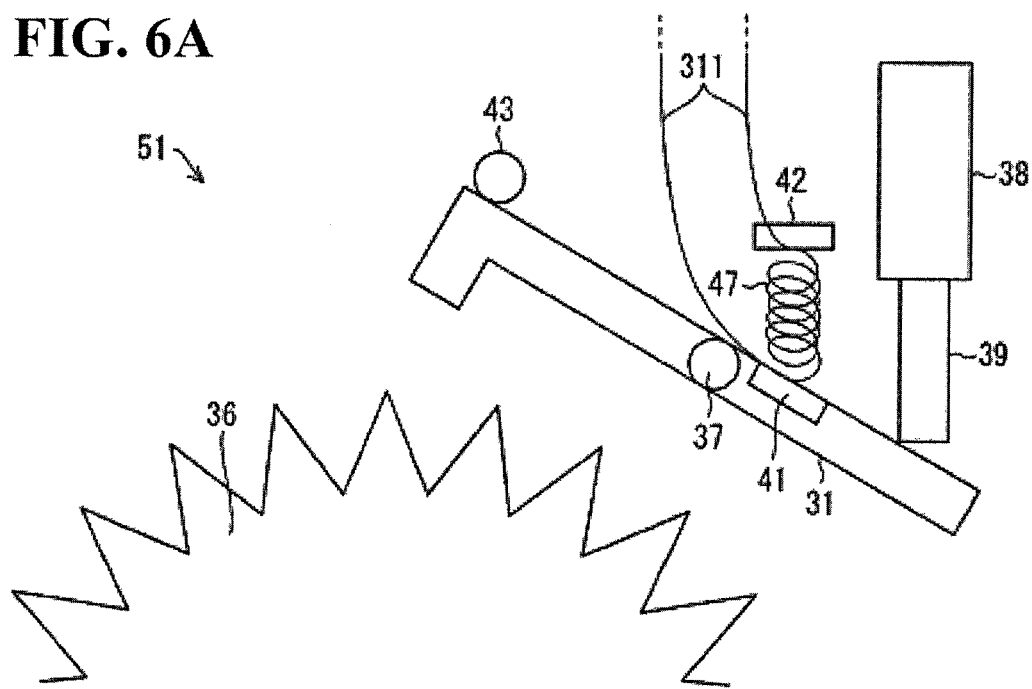
Figure 6B:
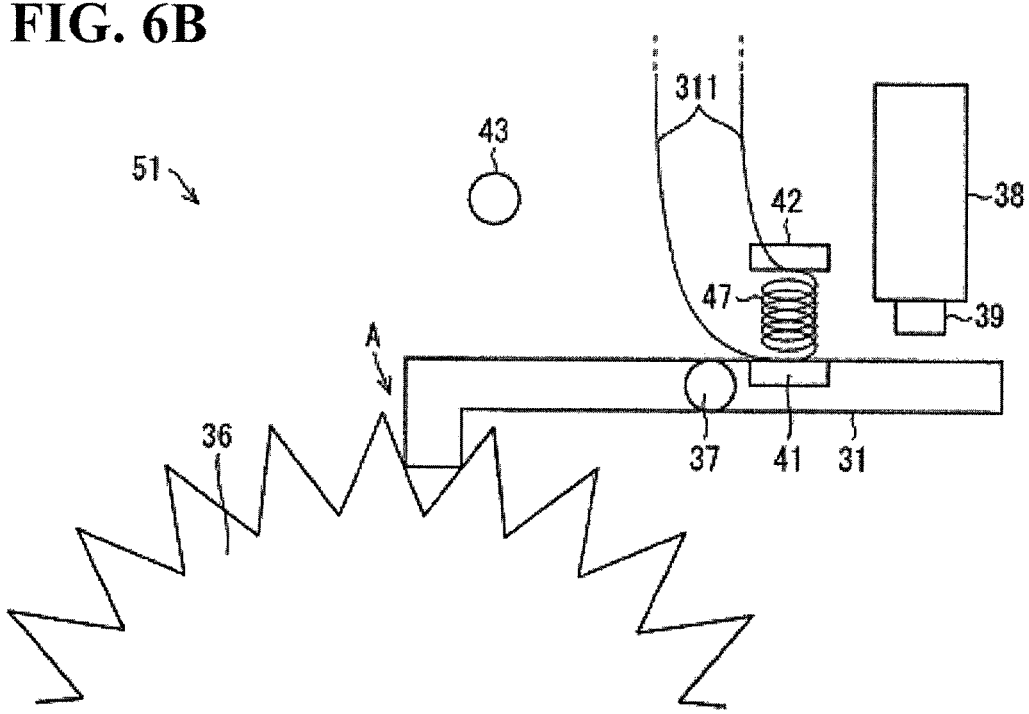

FIGS. 6A and 6B are diagrams schematically illustrating an exemplary configuration of the lock mechanism 51 in embodiment 2. FIG. 6A illustrates a state in which the lever 31 takes the first position, and FIG. 6B illustrates a state in which the lever 31 takes the second position.

In embodiment 2, instead of the coil spring 40 according to embodiment 1, the clutch 30 includes a coil spring 47, which is a helical tension spring. Both ends of the coil spring 47 are respectively secured to the first securing portion 41 and the second securing portion 42. The first securing portion 41 is disposed on the lever 31 on the side opposite to the lock position A side across the rotation shaft 37. The second securing portion 42 is disposed on the side opposite to the lock wheel 36 side across the lever 31. With this configuration, the coil spring 47 biases the lever 31 to the second position (namely, toward the lock wheel 36). It is noted that as illustrated in FIG. 6B, such adjustment is performed in advance that when the electromagnetic solenoid 38 is not driving the lever 31, the coil spring 47 has its adjacent rings in sequence in line-to-line contact with each other.

With this configuration, the coil spring 47 extends when the lever 31 changes from the second position to the first position. That is, conversely to embodiment 1, when the clutch 30 is released (FIG. 6A), the coil spring 47 extends, and when the clutch 30 is engaged (FIG. 6B), the coil spring 47 contracts. It is noted that similarly to embodiment 1, since the coil spring 47 extends and contracts in accordance with positional change of the lever 31, the resistance value of the conduction path of the coil spring 47 changes in accordance with the positional change of the lever 31. Consequently, the electric circuit 310 detects a change in the resistance value of the conduction path of the coil spring 47 so as to detect positional change of the lever 31 to detect whether the clutch 30 is engaged.

In embodiment 2, the coil spring 47 is adjusted to have its adjacent rings in sequence in line-to-line contact with each other when the lever 31 takes the second position. Such factors as degradation of the coil spring 47 over time, however, may result in a case where even though the lever 31 takes the second position, the coil spring 47 does not have line-to-line contact or a case where even though the coil spring 47 has line-to-line contact, the resistance value of the conduction path of the coil spring 47 does not vary. That is, even though the coil spring 47 is contracting, there may be obtained in error a detection result that the coil spring 47 is extending. In this embodiment, however, when the coil spring 47 is extending, it indicates that the clutch 30 is released. This prevents detection that the clutch 30, which is not engaged, is engaged. This improves safety.

Embodiment 3

A coil spring 48 according to embodiment 3 will now be described with reference to FIGS. 7A, 7B, and 7C. The components already described in this specification will be denoted with the same reference numerals and will not be elaborated here. The steering device 1 and the clutch 30 may include the coil spring 48 according to embodiment 3 in place of the coil spring 40 according to embodiment 1 or the coil spring 47 according to embodiment 2.

In embodiment 3, the coil spring 48 is a variable pitch spring having its adjacent rings in series at irregular intervals. The coil spring 48 may be a helical compression spring or a helical tension spring.

Figure 7A:
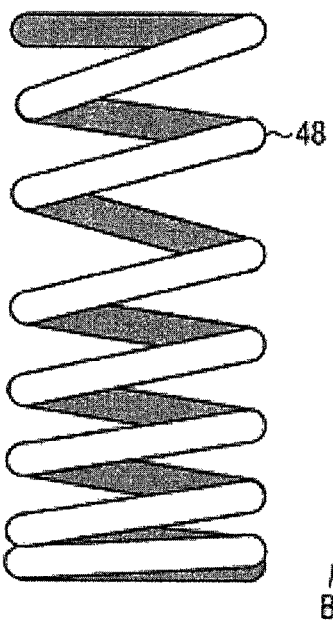
Figure 7B:
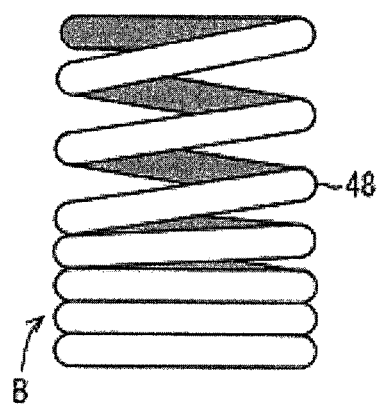
Figure 7C:
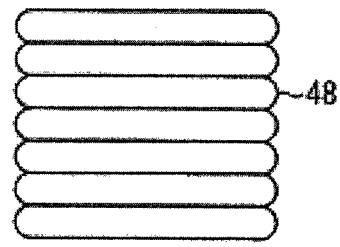

FIGS. 7A, 7B, and 7C are diagrams illustrating states of the coil spring 48. FIG. 7A illustrates an extending state, FIG. 7B illustrates an intermediate state, and FIG. 7C illustrates a contracting state. As illustrated in FIG. 7A, when the coil spring 48 is extending, some of its adjacent rings have smaller intervals (bottom of FIG. 7A), and some of its adjacent rings have larger intervals (top of FIG. 7A). This coil spring 48 has part (B in FIG. 7B) of its adjacent rings in line-to-line contact with each other when the coil spring 48 contracts to some degree as illustrated in FIG. 7B before the coil spring 48 completely contracts as illustrated in FIG. 7C. Consequently, in the state illustrated in FIG. 4A and in the state illustrated in FIG. 6B, the coil spring 48 has its adjacent rings in line-to-line contact with each other more reliably. This makes it possible to reliably change the resistance value of the conduction path of the coil spring 48 in accordance with positional change of the lever 31. In this embodiment, therefore, detection can be more reliably made as to whether the clutch 30 is engaged.

Moreover, since the resistance value of the conduction path of the coil spring 48 gradually changes as the coil spring 48 contracts, it is also possible to linearly detect the position of the lever 31.

Embodiment 4

A lock mechanism 52 and an electric circuit 316 according to embodiment 4 will now be described with reference to FIGS. 8A to 10B. The components already described in this specification will be denoted with the same reference numerals and will not be elaborated here. The steering device 1 and the clutch 30 may include the lock mechanism 52 and the electric circuit 316 according to embodiment 4 in place of the lock mechanism 50 and the electric circuit 310 according to embodiment 1.

Figure 8A:
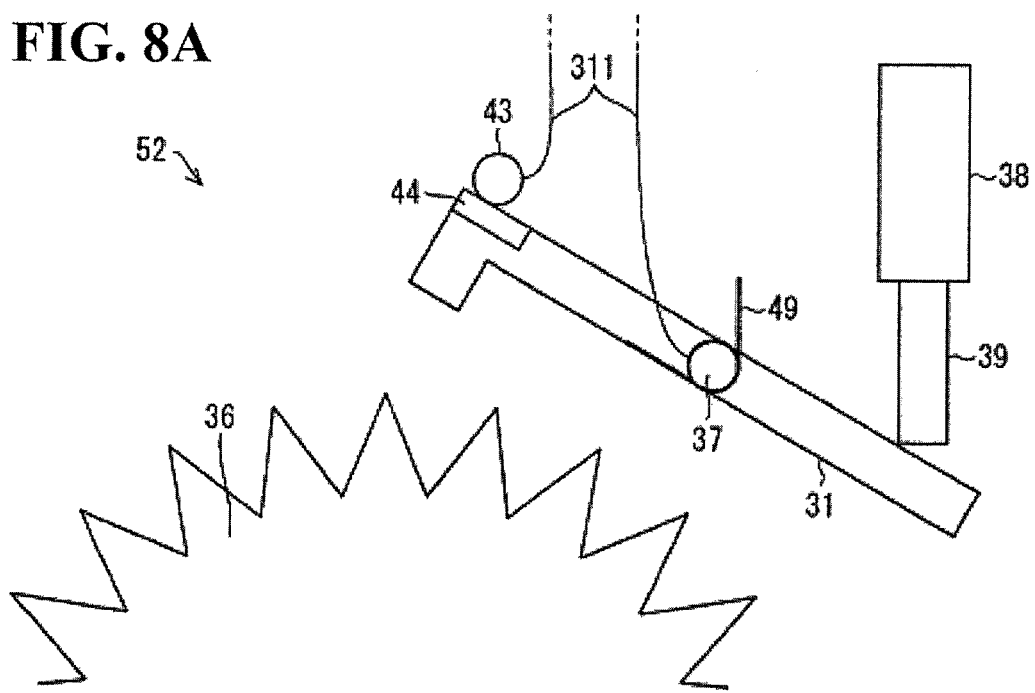
Figure 8B:
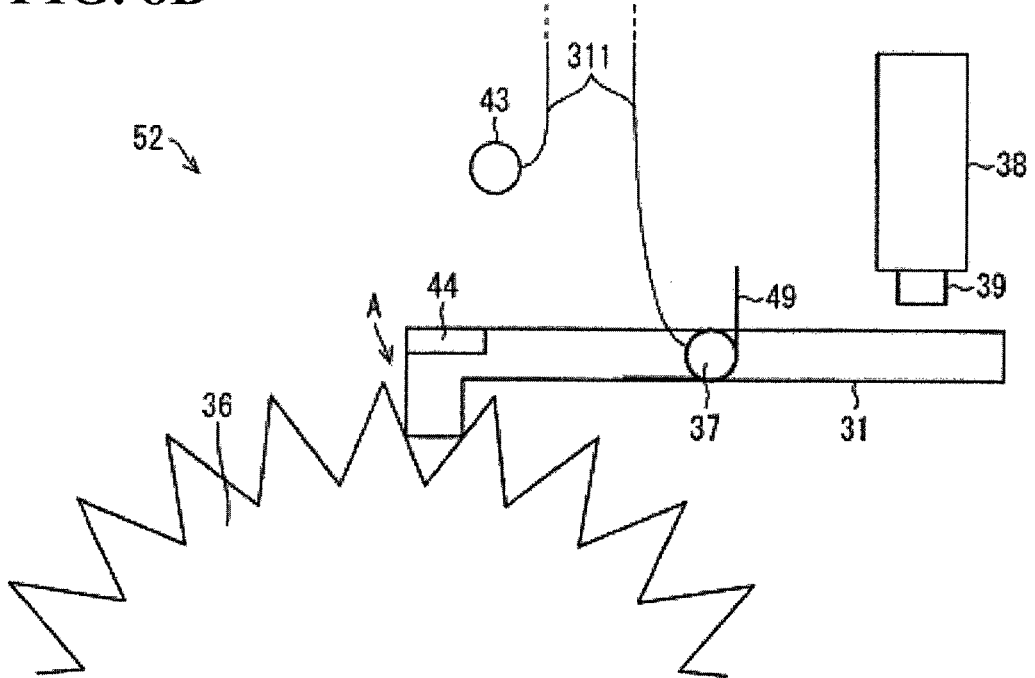

FIGS. 8A and 8B are diagrams schematically illustrating an exemplary configuration of the lock mechanism 52 in embodiment 4. FIG. 8A illustrates a state in which the lever 31 takes the first position, and FIG. 8B illustrates a state in which the lever 31 takes the second position. In embodiment 4, the clutch 30 includes a torsion spring 49 instead of the coil spring 40 according to embodiment 1. Similarly to the coil spring 40 according to embodiment 1, the torsion spring 49 biases the lever 31 to the second position (namely, toward the lock wheel 36). It is noted that in embodiment 4 as well, the coil springs according to embodiments 1 to 3 may be used in place of the torsion spring 49.

In embodiment 4, the lever 31 and the stopper pin 43 are made of conductors. The lever 31 includes a first contact portion 44 that comes into contact with the stopper pin 43 when the lever 31 is changed to the first position and that separates from the stopper pin 43 when the lever 31 is changed to the second position. With this configuration, the conduction path between the stopper pin 43 and the rotation shaft 37 includes a contact between the stopper pin 43 and (the first contact portion 44 of) the lever 31, and is a conduction path including two points that come into contact with or separate from each other in accordance with positional change of the lever 31.

The stopper pin 43 and the rotation shaft 37 of the lever 31 are each connected to the electric circuit 316 through the wiring 311. Similarly to the electric circuit 310 according to embodiment 1, the electric circuit 316 is a circuit to detect a resistance value of the conduction path connected to the electric circuit 316. In embodiment 4, the electric circuit 316 is capable of detecting a change in the resistance value of the conduction path between the stopper pin 43 and the rotation shaft 37. In embodiment 4, preferably, the plunger 39 is made of an insulator not to affect the resistance value of the conduction path.

It is noted that the wiring 311 is connected to the stopper pin 43 and the rotation shaft 37 that are not displaced when the position of the lever 31 is changed. This prevents the positional change of the lever 31 from moving the wiring 311 and causing a malfunction.

As described above, the stopper pin 43 and the first contact portion 44 are in contact with each other (FIG. 8A) or separate from each other (FIG. 8B) in accordance with positional change of the lever 31. When the stopper pin 43 and the first contact portion 44 are separate from each other, the conduction path between the stopper pin 43 and the rotation shaft 37 is naturally disconnected, and the resistance value of the conduction path is infinite. Consequently, the resistance value of the conduction path between the stopper pin 43 and the rotation shaft 37 changes in accordance with the positional change of the lever 31. The electric circuit 316 detects a change in the resistance value of the conduction path between the stopper pin 43 and the rotation shaft 37 so as to detect the positional change of the lever 31. As described above, since the torque transmission path between the steering member 200 and the wheel-turning unit 20 is mechanically coupled or uncoupled in accordance with positional change of the lever 31, the positional change of the lever 31 is detected to detect whether the clutch 30 is engaged.

Figure 9:
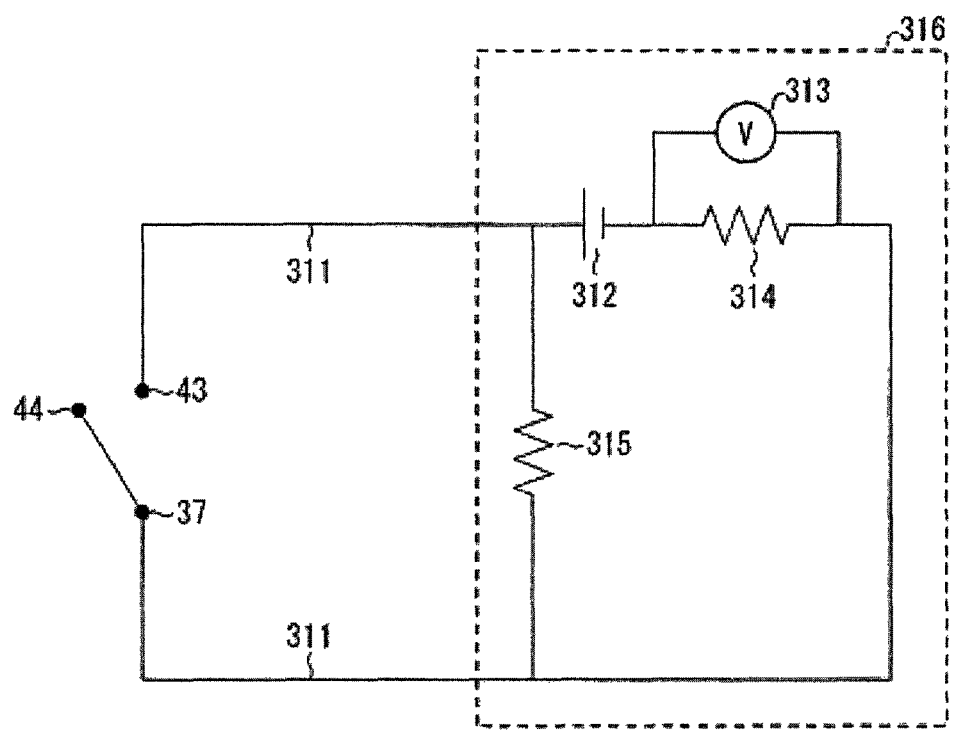
FIG. 9 is a circuit diagram illustrating an exemplary electric circuit according to the embodiment.

FIG. 9 is a circuit diagram illustrating an example of the electric circuit 316. In addition to the configuration of the electric circuit 310 according to embodiment 1, a second path having a predetermined resistance value is inserted in the electric circuit 316 in parallel to the conduction path. Specifically, as illustrated in FIG. 9, a resistor 315 is inserted in parallel to the conduction path. The electric circuit 316 is connected to the conduction path between the stopper pin 43 and the rotation shaft 37 through the wiring 311. This electric circuit 316 is capable of desirably detecting a change in the resistance value of the conduction path between the stopper pin 43 and the rotation shaft 37. Particularly, assume that the stopper pin 43 and the first contact portion 44 are separate from each other, and the resistance value of the conduction path between the stopper pin 43 and the rotation shaft 37 is infinite. Even in this case, current flows in the second path connected in parallel to the conduction path to prevent power leakage. It is noted that the configuration of the electric circuit 316 is not limited to the circuit illustrated in FIG. 9 insofar as the circuit is capable of detecting a change in the resistance value of the conduction path between the stopper pin 43 and the rotation shaft 37.

In embodiment 4, the whole lever 31 is a conductor. The present invention, however, is not limited to this configuration. Part of the lever 31 may be a conductor insofar as the conduction path includes the contact between the stopper pin 43 and the first contact portion 44. For example, only a portion connecting the first contact portion 44 and the rotation shaft 37 to each other may be a conductor or the configuration may include wiring between the first contact portion 44 and the rotation shaft 37.

Figure 10A:
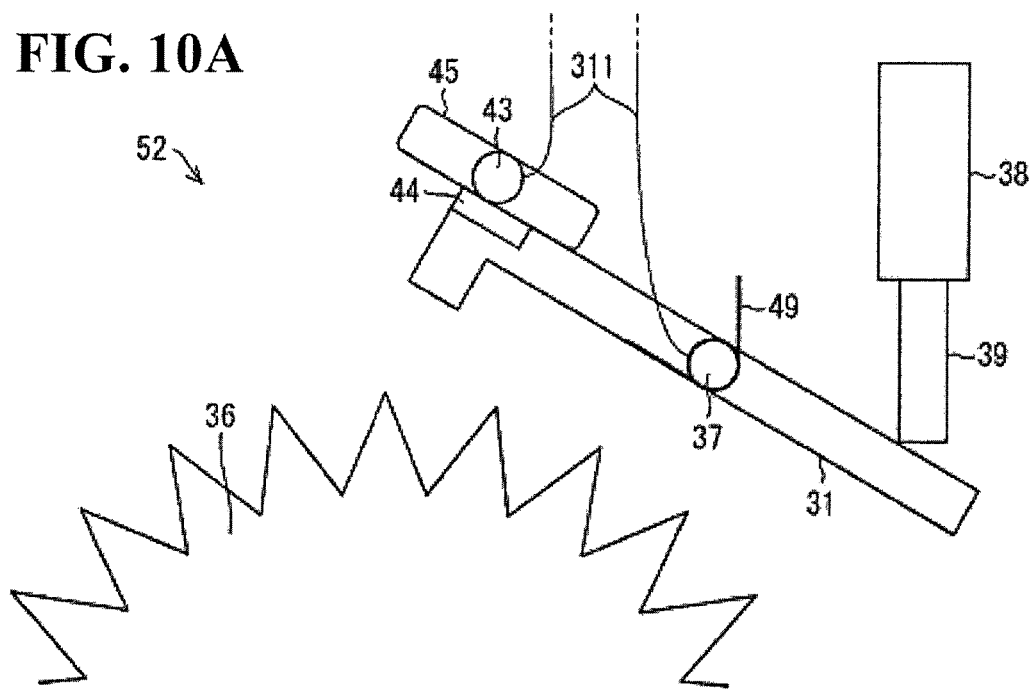
FIGS. 10A and 10B are diagrams schematically illustrating exemplary configurations of the lock mechanism according to the embodiment.

Alternatively, as illustrated in FIG. 10A, a conductive portion 45 may be disposed around the stopper pin 43 so as to reliably electrically connect the stopper pin 43 and the lever 31 to each other when the lever 31 is changed to the first position.

Figure 10B:
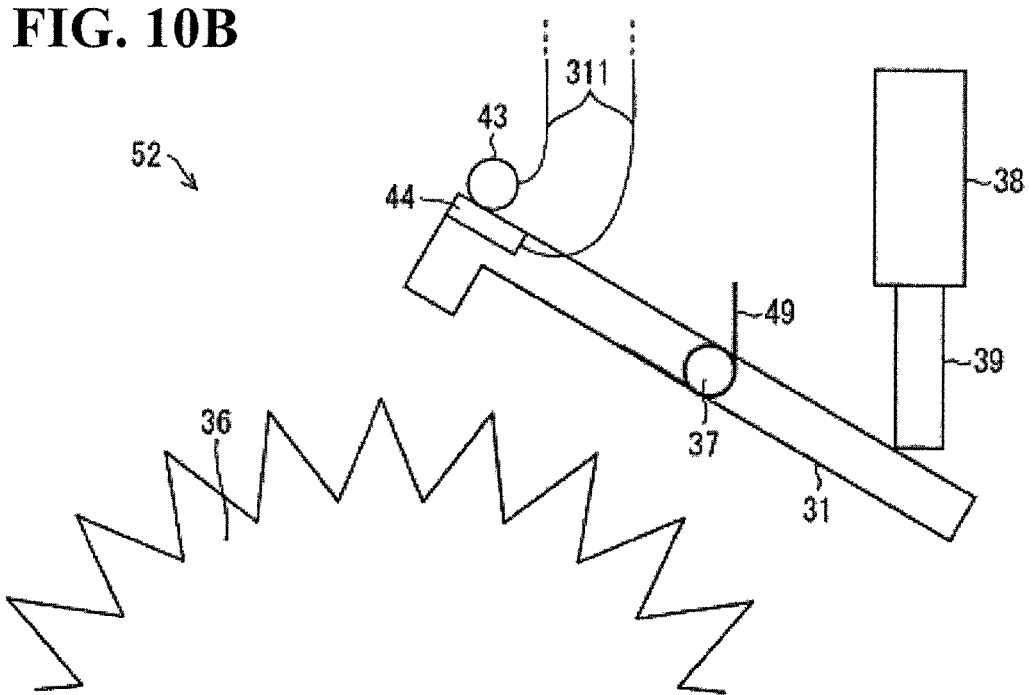

Alternatively, as illustrated in FIG. 10B, the wiring 311 may be connected not to the rotation shaft 37 of the lever 31 but to a different portion such as the first contact portion 44.

Embodiment 5

A lock mechanism 53 according to embodiment 5 will now be described with reference to FIGS. 11A, 11B, and 12. The components already described in this specification will be denoted with the same reference numerals and will not be elaborated here. The steering device 1 and the clutch 30 may include the lock mechanism 53 according to embodiment 5 in place of the lock mechanism 52 according to embodiment 4.

Figure 11A:
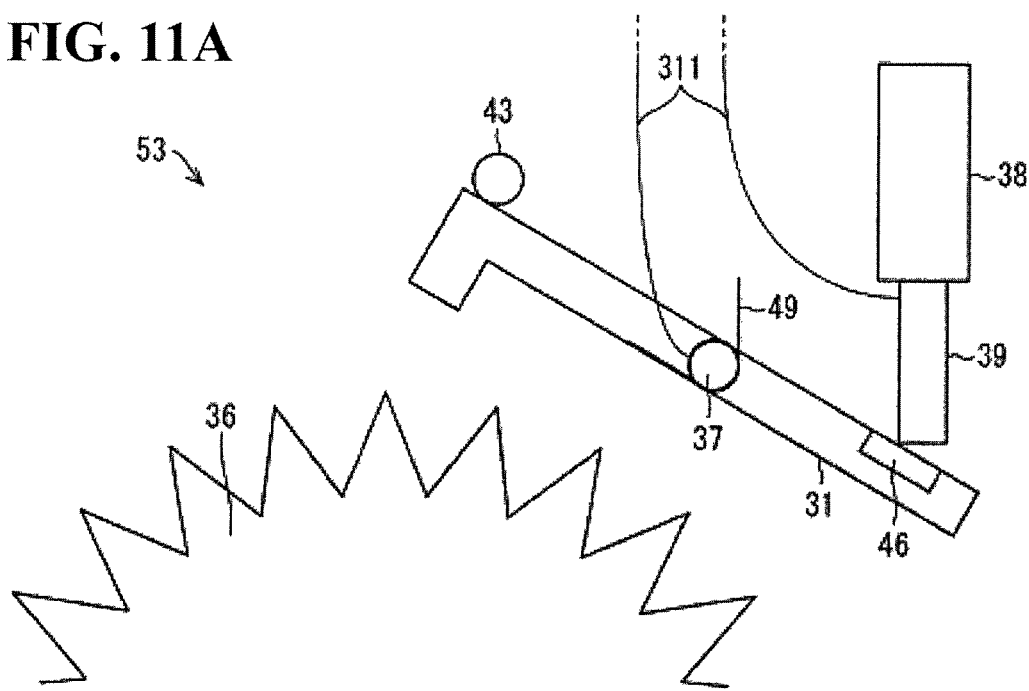
Figure 11B:
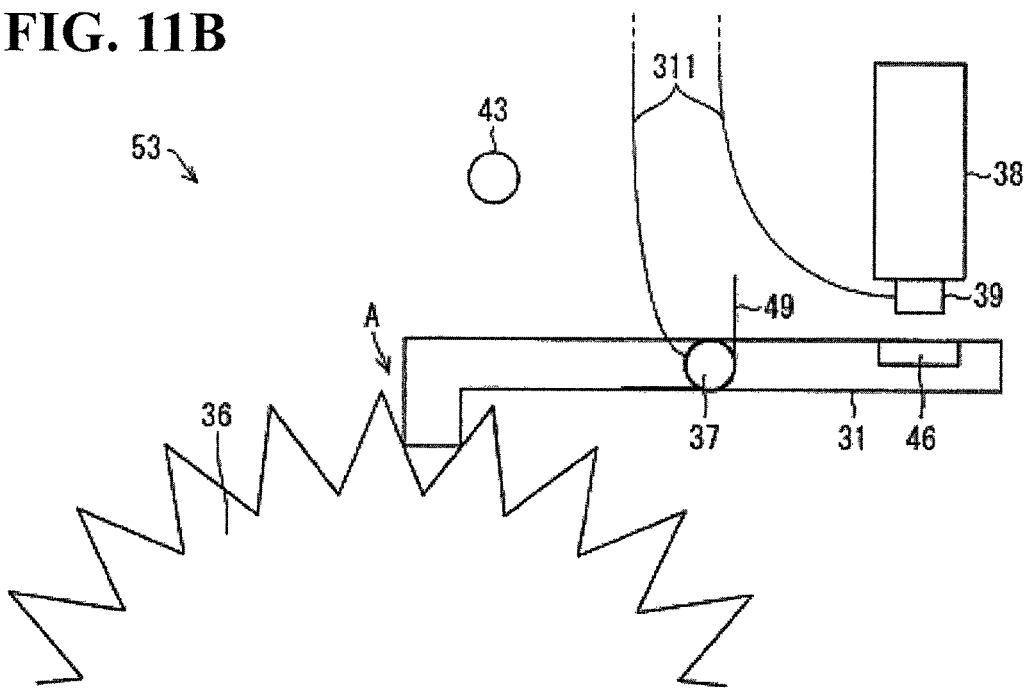

FIGS. 11A and 11B are diagrams schematically illustrating an exemplary configuration of the lock mechanism 53 in embodiment 5. FIG. 11A illustrates a state in which the lever 31 takes the first position, and FIG. 11B illustrates a state in which the lever 31 takes the second position.

In embodiment 5, the lever 31 and the plunger 39 are made of conductors. The lever 31 includes a second contact portion 46 with which the plunger 39 is in contact when the electromagnetic solenoid 38 drives the lever 31 and which is separate from the plunger 39 when the electromagnetic solenoid 38 does not drive the lever 31. With this configuration, the conduction path between the plunger 39 and the rotation shaft 37 includes a contact between the plunger 39 and (the second contact portion 46 of) the lever 31. Thus, the conduction path includes the two points that come into contact with or separate from each other in accordance with positional change of the lever 31.

The plunger 39 and the rotation shaft 37 of the lever 31 are each connected to the electric circuit 316 through the wiring 311. That is, in this embodiment, the electric circuit 316 is capable of detecting a change in the resistance value of the conduction path between the plunger 39 and the rotation shaft 37. It is noted that in this embodiment, preferably, the stopper pin 43 is an insulator not to affect the resistance value of the conduction path.

Since the plunger 39 and the second contact portion 46 come into contact with or separate from each other in accordance with positional change of the lever 31, the resistance value of the conduction path between the plunger 39 and the rotation shaft 37 changes in accordance with the positional change of the lever 31. The electric circuit 316 detects a change in the resistance value of the conduction path between the plunger 39 and the rotation shaft 37 so as to detect the positional change of the lever 31. This makes it possible to detect whether the clutch 30 is engaged.

Figure 12:
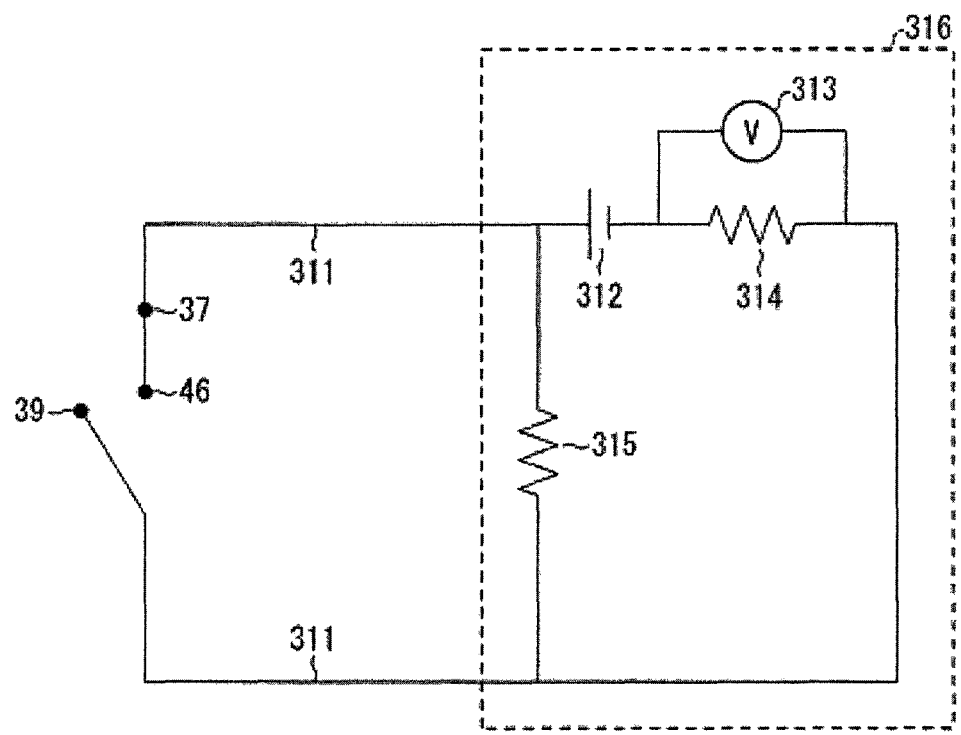
FIG. 12 is a circuit diagram illustrating an exemplary electric circuit according to the embodiment.

FIG. 12 is a circuit diagram illustrating an example of the electric circuit 316 to which the conduction path between the plunger 39 and the rotation shaft 37 is connected. This electric circuit 316 is used for desirably detecting a change in the resistance value of the conduction path between the stopper pin 43 and the rotation shaft 37. The configuration of the electric circuit 316, however, is not limited to the circuit illustrated in FIG. 12.

Although the whole lever 31 is a conductor in this embodiment, the present invention is not limited to this configuration. Part of the lever 31 may be a conductor insofar as the conduction path is formed to include the contact between the plunger 39 and the second contact portion 46. For example, only a portion between the second contact portion 46 and the rotation shaft 37 may be made of a conductor or the configuration may include wiring between the second contact portion 46 and the rotation shaft 37.

Embodiment 6

As described above, in accordance with positional change of the lever 31, the lever 31 and the plunger 39 come into contact with or separate from each other, and the lever 31 and the stopper pin 43 come into contact with or separate from each other. Consequently, the resistance value of a conduction path between two of (the rotation shaft 37 of) the lever 31, the plunger 39, and the stopper pin 43 changes in accordance with positional change of the lever 31. The electric circuit 316 detects a change in the resistance value of the conduction path so as to detect the positional change of the lever 31. This makes it possible to detect whether the clutch 30 is engaged. The conduction path between the stopper pin 43 and the rotation shaft 37 has already been described in embodiment 4. The conduction path between the plunger 39 and the rotation shaft 37 has already been described in embodiment 5. In embodiment 6, therefore, a conduction path between the stopper pin 43 and the plunger 39 will be described.

A lock mechanism 54 according to embodiment 6 will now be described with reference to FIGS. 13A, 13B, and 14. The components already described in this specification will be denoted with the same reference numerals and will not be elaborated here. The steering device 1 and the clutch 30 may include the lock mechanism 54 according to embodiment 6 in place of the lock mechanism 52 according to embodiment 4.

Figure 13A:
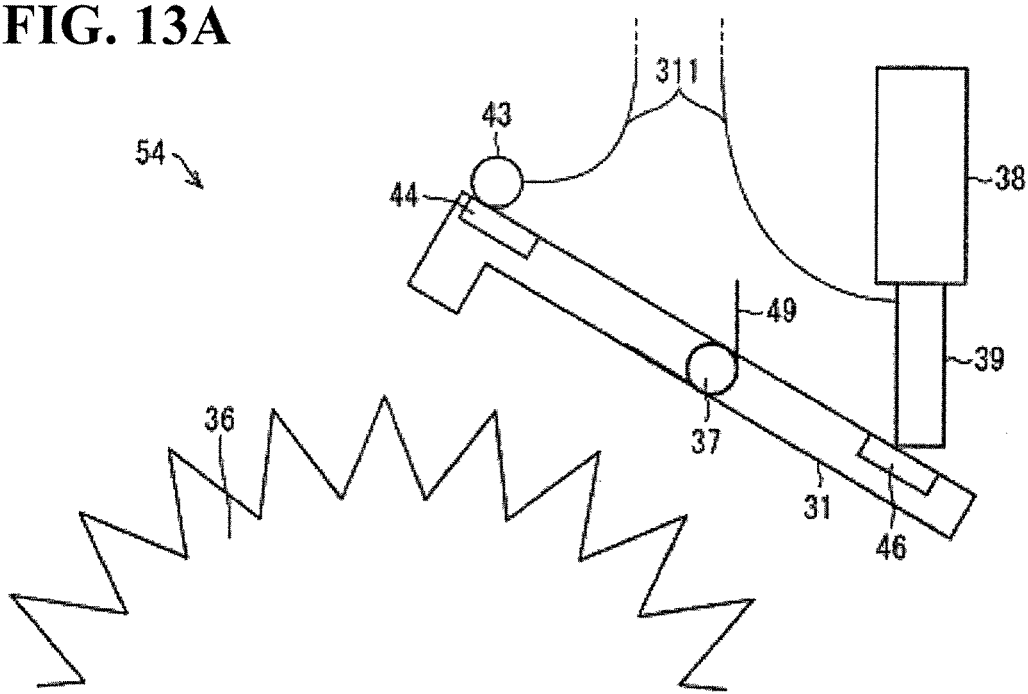
Figure 13B:
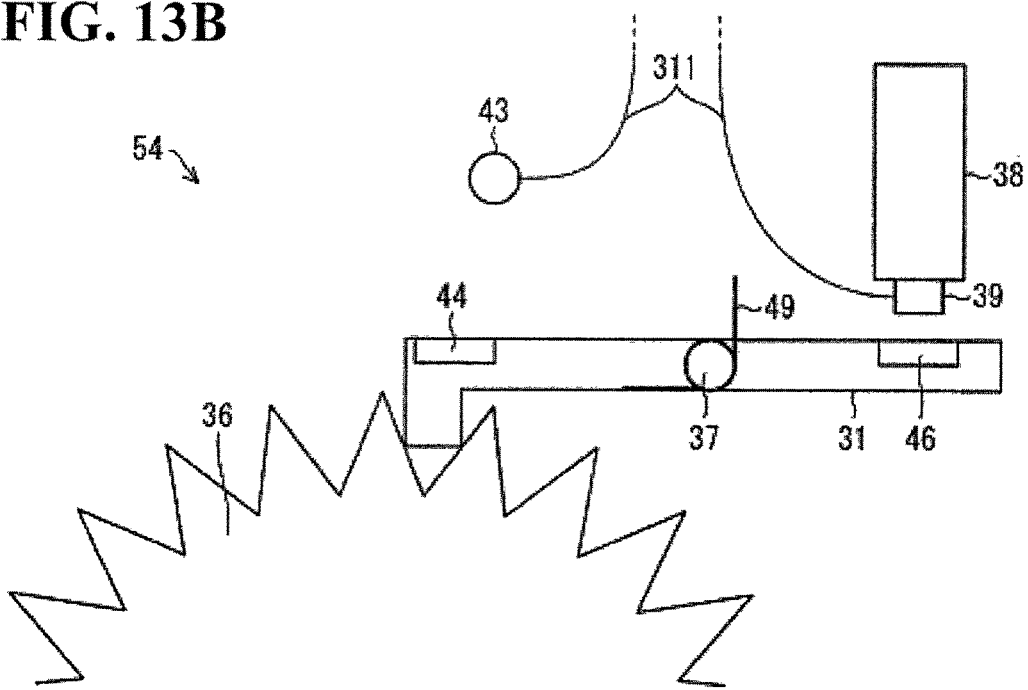

FIGS. 13A and 13B are diagrams schematically illustrating an exemplary configuration of the lock mechanism 54 in embodiment 6. FIG. 13A illustrates a state in which the lever 31 takes the first position, and FIG. 13B illustrates a state in which the lever 31 takes the second position.

In this embodiment, the lever 31, the plunger 39, and the stopper pin 43 are made of conductors. The lever 31 includes the first contact portion 44 and the second contact portion 46. The first contact portion 44 comes into contact with the stopper pin 43 when the lever 31 is changed to the first position, and the first contact portion 44 separates from the stopper pin 43 when the lever 31 is changed to the second position. The plunger 39 comes into contact with the second contact portion 46 when the electromagnetic solenoid 38 drives the lever 31, and the second contact portion 46 separates from the plunger 39 when the electromagnetic solenoid 38 does not drive the lever 31. With this configuration, the conduction path between the stopper pin 43 and the plunger 39 includes the contact between the stopper pin 43 and (the first contact portion 44 of) the lever 31 and the contact between the plunger 39 and (the second contact portion 46 of) the lever 31. Thus, the conduction path includes the two points that come into contact with or separate from each other in accordance with positional change of the lever 31.

The stopper pin 43 and the plunger 39 are each connected to the electric circuit 316 through the wiring 311. That is, in this embodiment, the electric circuit 316 is capable of detecting a change in the resistance value of the conduction path between the stopper pin 43 and the plunger 39. The stopper pin 43 and the first contact portion 44 come into contact with or separate from each other in accordance with positional change of the lever 31. The plunger 39 and the second contact portion 46 come into contact with or separate from each other in accordance with positional change of the lever 31. Consequently, the resistance value of the conduction path between the stopper pin 43 and the plunger 39 changes in accordance with the positional change of the lever 31. The electric circuit 316 detects a change in the resistance value of the conduction path between the stopper pin 43 and the plunger 39 so as to detect the positional change of the lever 31. Thus, it is possible to detect whether the clutch 30 is engaged.

Figure 14:
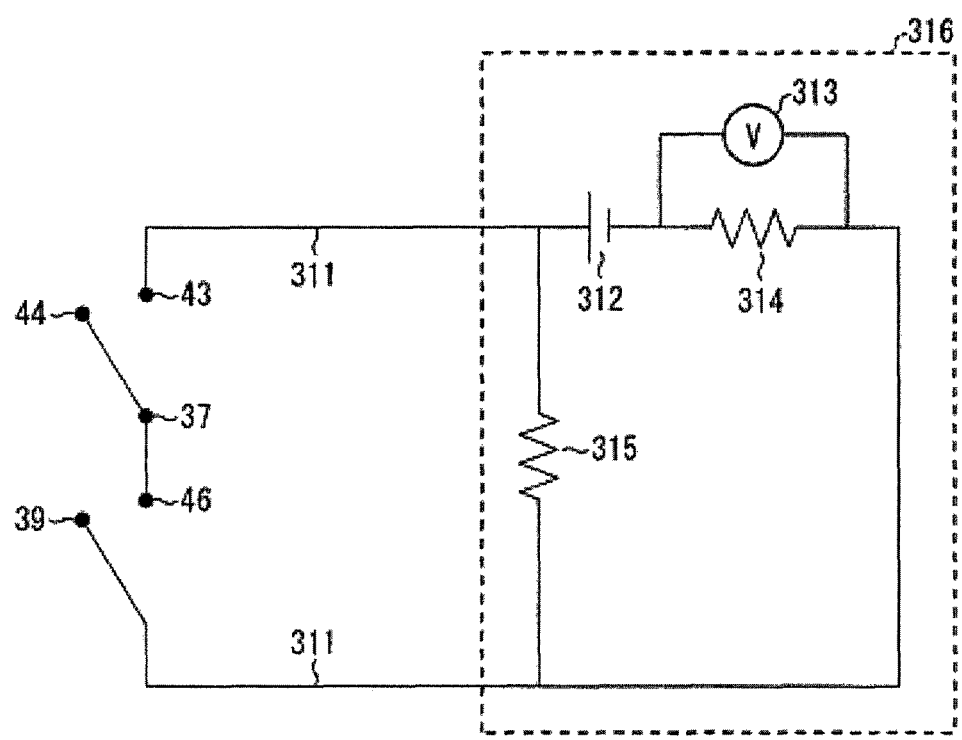
FIG. 14 is a circuit diagram illustrating an exemplary electric circuit according to the embodiment.

FIG. 14 is a circuit diagram illustrating an example of the electric circuit 316 to which the conduction path between the stopper pin 43 and the plunger 39 is connected. This electric circuit 316 is used for desirably detecting a change in the resistance value of the conduction path between the stopper pin 43 and the plunger 39. It is noted that the configuration of the electric circuit 316 is not limited to the circuit illustrated in FIG. 14.

It is noted that in this embodiment, the whole lever 31 is a conductor. The present invention, however, is not limited to this configuration. Part of the lever 31 may be a conductor insofar as the conduction path is arranged to include the contact between the stopper pin 43 and the first contact portion 44 and the contact between the plunger 39 and the second contact portion 46. For example, only a portion between the first contact portion 44 and the second contact portion 46 may be a conductor or the configuration may include wiring to connect the first contact portion 44 and the second contact portion 46 to each other.

In this embodiment, since the resistance value of the conduction path changes in accordance with a state of the clutch, the electric circuit to detect a change in the resistance value of the conduction path is used for readily detecting whether the clutch is engaged.

The embodiment facilitates detection as to whether the clutch of the steer-by-wire steering device is engaged.

Obviously, numerous modifications and variations of the present invention are possible in light of the above teachings. It is therefore to be understood that within the scope of the appended claims, the present invention may be practiced otherwise than as specifically described herein.

The invention claimed is:

1. A clutch for use in a steer-by-wire steering device for a vehicle, the clutch being configured to switch between mechanically coupling and uncoupling a torque transmission path between a steering member operated by a driver and a wheel-turning unit configured to turn wheels, the clutch comprising:
 a position change member configured to change between a first position and a second position to switch between mechanically coupling and uncoupling the torque transmission path; and
 a conduction path comprising two points that come into contact with or separate from each other in accordance with positional change of the position change member, the conduction path being connected to an electric circuit configured to detect a change in a resistance value of the conduction path.

2. The clutch according to claim 1, configured to mechanically uncouple the torque transmission path when the position change member is at the first position and to mechanically couple the torque transmission path when the position change member is at the second position, wherein the position change member is a lever configured to rotate about a rotation shaft of the position change member and further comprises
 an electromagnetic solenoid configured to drive the position change member to the first position, and
 a spring configured to bias the position change member to the second position.

3. The clutch according to claim 2, further comprising:
 a sun gear;
 an internal gear coaxially disposed around the sun gear;
 a plurality of planetary gears configured to mesh with the sun gear and the internal gear;
 a first rotation member configured to rotatably support the plurality of planetary gears and rotate coaxially with the sun gear; and
 a second rotation member configured to integrally rotate with one of the sun gear, the internal gear, and the first rotation member,
 wherein the position change member is configured to, when the position change member changes to the first position, separate from the second rotation member, and the position change member is configured to, when the position change member changes to the second position, engage with the second rotation member to lock rotation of the second rotation member, and
 wherein of three elements comprising the sun gear, the internal gear, and the first rotation member, a first element is connected to the steering member in a torque transmittable manner, a second element is connected to the wheel-turning unit in a torque transmittable manner, and a third element is configured to integrally rotate with the second rotation member.

4. The clutch according to claim 3,
 wherein the spring comprises a helical compression spring or a helical tension spring and is configured to extend and contract in accordance with positional change of the position change member, and
 wherein the conduction path comprises the spring.

5. The clutch according to claim 4, wherein the spring comprises a variable pitch spring.

6. The clutch according to claim 5, wherein the spring comprises a helical tension spring and is configured to extend when the position change member changes from the second position to the first position.

7. The clutch according to claim 3, further comprising a stopper configured to come into contact with the position change member when the position change member changes to the first position, wherein the conduction path comprises a contact between the stopper and the position change member.

8. The clutch according to claim 7,
 wherein the electromagnetic solenoid comprises a plunger configured to come into contact with the position change member when the electromagnetic solenoid drives the position change member, and
 wherein the conduction path comprises a contact between the plunger and the position change member.

9. The clutch according to claim 3,
 wherein the electromagnetic solenoid comprises a plunger configured to come into contact with the position change member when the electromagnetic solenoid drives the position change member, and
 wherein the conduction path comprises a contact between the plunger and the position change member.

10. The clutch according to claim 2,
 wherein the spring comprises a helical compression spring or a helical tension spring and is configured to extend and contract in accordance with positional change of the position change member, and
 wherein the conduction path comprises the spring.

11. The clutch according to claim 10, wherein the spring comprises a variable pitch spring.

12. The clutch according to claim 11, wherein the spring comprises a helical tension spring and is configured to extend when the position change member changes from the second position to the first position.

13. The clutch according to claim 10, wherein the spring comprises a helical tension spring and is configured to extend when the position change member changes from the second position to the first position.

14. The clutch according to claim 13, wherein the conduction path is connected to the electric circuit through the rotation shaft.

15. The clutch according to claim 2, further comprising a stopper configured to come into contact with the position change member when the position change member changes to the first position, wherein the conduction path comprises a contact between the stopper and the position change member.

16. The clutch according to claim 15, wherein a second path comprising a predetermined resistance value is inserted in the electric circuit in parallel to the conduction path.

17. The clutch according to claim 15,
 wherein the electromagnetic solenoid comprises a plunger configured to come into contact with the position change member when the electromagnetic solenoid drives the position change member, and
 wherein the conduction path comprises a contact between the plunger and the position change member.

18. The clutch according to claim 15, wherein the conduction path is connected to the electric circuit through the rotation shaft.

19. The clutch according to claim 2,
 wherein the electromagnetic solenoid comprises a plunger configured to come into contact with the position change member when the electromagnetic solenoid drives the position change member, and wherein the conduction path comprises a contact between the plunger and the position change member.

20. A steer-by-wire steering device for a vehicle, the steering device comprising:
a steering member operated by a driver;
a wheel-turning unit configured to turn wheels; and
a clutch configured to switch between mechanically coupling and uncoupling a torque transmission path between the steering member and the wheel-turning unit, the clutch comprising:
 a position change member configured to change between a first position and a second position to switch between mechanically coupling and uncoupling the torque transmission path;
 a conduction path comprising two points that come into contact with or separate from each other in accordance with positional change of the position change member; and
 an electric circuit connected to the conduction path so as to detect a change in a resistance value of the conduction path.

* * * * *